(12) United States Patent
Hartig et al.

(10) Patent No.: US 7,393,020 B2
(45) Date of Patent: Jul. 1, 2008

(54) CONNECTION OF TWO PIPES AND SEALING RING FOR THE CONNECTION

(75) Inventors: Günther Hartig, Berkshire (GB); Steve Williams, Oxon (GB)

(73) Assignee: NORMA Germany GmbH, Maintal (DE)

( * ) Notice: Subject to any disclaimer, the term of this patent is extended or adjusted under 35 U.S.C. 154(b) by 32 days.

(21) Appl. No.: 11/251,052

(22) Filed: Oct. 14, 2005

(65) Prior Publication Data
US 2006/0082154 A1   Apr. 20, 2006

(30) Foreign Application Priority Data
Oct. 15, 2004   (DE) .................. 10 2004 050 302

(51) Int. Cl.
*F16L 19/00* (2006.01)
(52) U.S. Cl. .................. 285/365; 285/424; 285/367; 285/410; 277/612; 277/608; 277/626
(58) Field of Classification Search .............. 285/424, 285/365, 366, 367, 406, 407, 408, 409, 410, 285/411; 277/595, 612, 608, 626
See application file for complete search history.

(56) References Cited

U.S. PATENT DOCUMENTS

| | | | |
|---|---|---|---|
| 805,645 A | | 11/1905 | Guillott |
| 2,761,707 A | * | 9/1956 | Herman .................. 285/367 |
| 3,180,662 A | * | 4/1965 | Parlasca et al. ............ 285/95 |
| 3,455,582 A | * | 7/1969 | Von Hoevel ............. 285/302 |
| 3,633,928 A | | 1/1972 | Douglas |
| 3,674,291 A | | 7/1972 | Goldberg |
| 3,820,831 A | * | 6/1974 | Swedelius ............... 285/367 |
| 3,964,773 A | * | 6/1976 | Stade et al. ............. 285/367 |
| 4,175,754 A | * | 11/1979 | Wilhelm .................. 277/608 |
| 4,579,374 A | * | 4/1986 | Bell ..................... 285/334.4 |
| 4,597,596 A | * | 7/1986 | Tozer ..................... 285/187 |

(Continued)

FOREIGN PATENT DOCUMENTS

DE     890 588     9/1953

(Continued)

OTHER PUBLICATIONS

Brochure No. 6, NORMA® Profilschellen Kegelflanschverbidnungen, Sep. 1987, p. 6, Left col., Upper Figure.

*Primary Examiner*—David E Bochna
(74) *Attorney, Agent, or Firm*—Friedrich Kueffner

(57) ABSTRACT

In a pipe connection, a first pipe has a first flange of sheet metal provided with a first wall connected circumferentially to the first pipe. A second pipe has an end section shaped as a second flange. A clamp engages across the first and second flanges and has conical sidewalls forcing the first and second flanges axially against one another when tightening the clamp. The first flange delimits together with the first pipe an annular chamber that is coaxial to the longitudinal pipe axis. The first flange has a second wall that is glidingly supported on a free end of the first pipe. A sheet metal sealing ring is positioned between the first and second flanges. It has an edge section that is bent back onto a remaining sealing ring section that has a corrugation projecting past the bent edge section in an untightened state of the clamp.

12 Claims, 3 Drawing Sheets

U.S. PATENT DOCUMENTS

| | | | |
|---|---|---|---|
| 4,693,502 A | * | 9/1987 | Oetiker .................... 285/334.5 |
| 5,213,345 A | * | 5/1993 | Udagawa ..................... 277/595 |
| 5,294,135 A | * | 3/1994 | Kubouchi et al. ........... 277/595 |
| 5,505,498 A | * | 4/1996 | Halling et al. .............. 285/111 |
| 5,582,415 A | * | 12/1996 | Yoshida et al. .............. 277/592 |
| 6,209,883 B1 | * | 4/2001 | Kashmerick et al. ........ 277/593 |

FOREIGN PATENT DOCUMENTS

| | | |
|---|---|---|
| EP | 0 573 764 | 12/1993 |
| FR | 00 08073 | 12/2001 |
| WO | 2005/088093 | 9/2005 |

* cited by examiner

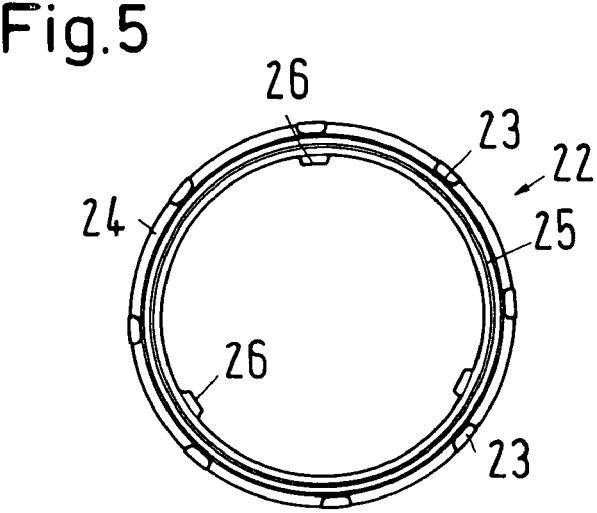
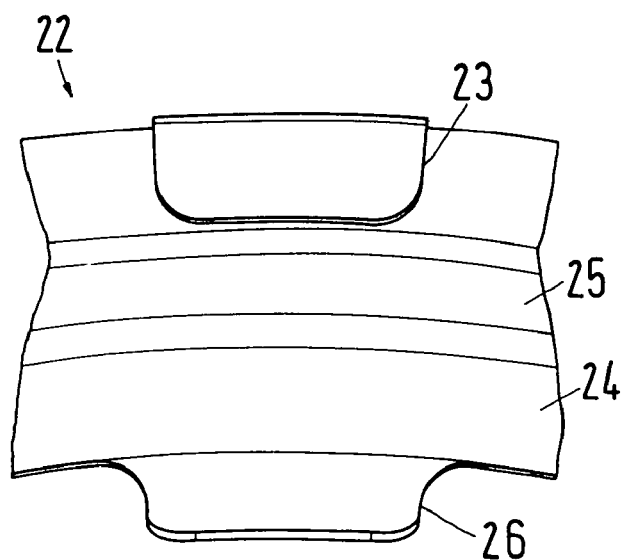
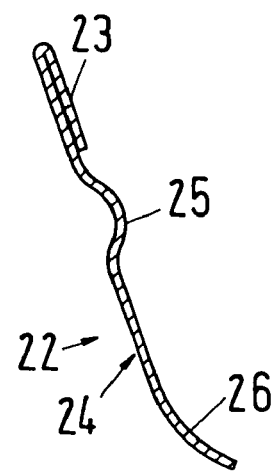

CONNECTION OF TWO PIPES AND SEALING RING FOR THE CONNECTION

BACKGROUND OF THE INVENTION

1. Field of the Invention

The invention relates to a connection of two pipes, wherein a first pipe has a first flange of sheet metal that is connected with a first wall to the pipe circumference and wherein a second pipe has an end section that is shaped as a second flange. The connection comprises a tightenable clamp engaging across the two flanges and provided with conical sidewalls by which the flanges when the clamp is tightened are forced axially against one another. Moreover, the invention relates to a sealing ring for such a connection.

2. Description of the Related Art

A connection of this kind is disclosed as a schematic detail illustration in the brochure No. 6 "NORMA® PROFILSCHELLEN KEGELFLANSCHVERBIDNUNGEN"; Sep. 1987, page 6, left column, upper figure. This connection shows the free ends of both flanges contacting one another wherein the two flanges delimit an annular chamber together with the first pipe to which the first flange is welded. When the pipes to be connected are components of an exhaust gas manifold of a motor vehicle, very hot exhaust gases at a temperature of approximately 900 to 1000° C. pass through the pipes. Accordingly, the pipes are heated to very high temperatures so that they expand (widen) radially to a greater extent than the clamp that is exposed to a reduced temperature because it is positioned radially outwardly and therefore can be over-extended and rupture.

SUMMARY OF THE INVENTION

It is an object of the present invention to provide a pipe connection of the aforementioned kind in which the clamp is subjected to a reduced thermal load.

In accordance with the present invention, this is achieved in that the first flange delimits together with the first pipe a closed annular chamber that is coaxial to the longitudinal axis of the first pipe, wherein a second wall of the first flange is glidingly supported on the free end of the first pipe.

In accordance with this solution, the first flange remains relatively cool because of the air that is enclosed in the closed annular chamber. The first flange thermally widens therefore to a lesser degree but can bend radially inwardly relative to the first pipe under the thermal radial expansion pressure of the first pipe while being supported on the clamp because the wall that is not welded to the first pipe can glide across the free end of the first pipe so that the radial expansion pressure of the first pipe can be compensated for the most part by the bending action of the first flange without being transmitted completely onto the clamp.

Preferably, the free end of the first pipe is beveled. On this bevel of the first pipe the second wall of the first flange can glide more easily under radial thermal expansion pressure.

When the second wall of the first flange is supported with a rounded portion on the free end of the first pipe, the second wall of the first flange can glide even more easily on the bevel of the first pipe under the radial expansion pressure.

It is preferred to provide the second pipe between the second flange and the remaining pipe section with an elastically bendable cylindrical section. By means of the radial elastic bending action of the cylindrical section, a great portion of the radial expansion pressure of the second pipe can be taken up. At the same time, the elasticity of the cylindrical section allows an angled arrangement or radial displacement of the two pipes relative to one another when, as a result of a minimal assembly error, they are not precisely coaxially aligned with one another.

Moreover, the inner diameter of the cylindrical section can be greater than the outer diameter of the first pipe. This makes it possible that the transition section of the second pipe between the cylindrical section and the remaining pipe section of the second pipe connected thereto can bend under the axial thermal expansion pressure of both pipes so that it provides an axial expansion compensation in this way.

Preferably, it is moreover provided that the rounded portion of the second wall of the first flange passes into a cylindrical projection and the inner diameter of the cylindrical section of the second pipe is greater than the outer diameter of the projection. This configuration has the advantage that a gap or play is provided between the cylindrical projection of the second wall of the first flange wherein the projection also forms at the same time a cylindrical projection of the first pipe that facilitates insertion of the two pipes into one another because the second pipe is guided on the projection. At the same time, both pipes can be centered substantially in this way when they are not coaxially inserted into one another initially.

It is moreover beneficial when the transition section between the cylindrical section and the remaining pipe section of the second pipe connected thereto is conical. The conical configuration and elasticity of the transition section facilitate also a radial thermal expansion of the remaining pipe section of the second pipe relative to its cylindrical section and the second flange so that the radial thermal expansion pressure of the second pipe onto the clamp can also be partially compensated by the transition section.

A further advantageous configuration resides in that the connection between the flanges has a sealing ring in the form of an elastic sheet steel strap with at least one edge section which is bent back onto a portion of the remaining sealing ring section and in that the remaining sealing ring section has at least one corrugation that projects past the thickness of the bent edge section in the untightened state of the clamp. This sealing ring withstands, on the one hand, high temperatures as they are encountered in exhaust gas pipes but is still elastic within the area of its corrugation. This corrugation not only receives the tightening pressure but also the axial thermal expansion of both pipes relative to one another without being deformed completely to a plane shape (back deformation). This back deformation is prevented in that the bent-back edge section or sections acts or act as a stop for the second flange of the second pipe and, in this way, prevents or prevent a further back deformation of the corrugation. The elasticity of the corrugation remains substantially intact and contributes to the reduction of thermal axial load of the clamp by thermal expansion of the pipes.

Each edge section can be in the form of a tab that can be more easily bent than a continuous circumferential crimped edge section of the sealing ring that extends across the circumference of the remaining edge section of the sealing ring.

The corrugation extends preferably across the entire circumference of the sealing ring. It can therefore be formed by a simple stamping tool.

BRIEF DESCRIPTION OF THE DRAWING

In the drawing:

FIG. 5 is a reduced size side view of the sealing ring of the connection illustrated in FIGS. 1 and 2;

FIG. 6 is a detail view of the sealing ring according to FIG. 5; and

FIG. 7 is a cross-section of the sealing ring according to FIG. 6.

DESCRIPTION OF THE PREFERRED EMBODIMENTS

Figure 1:
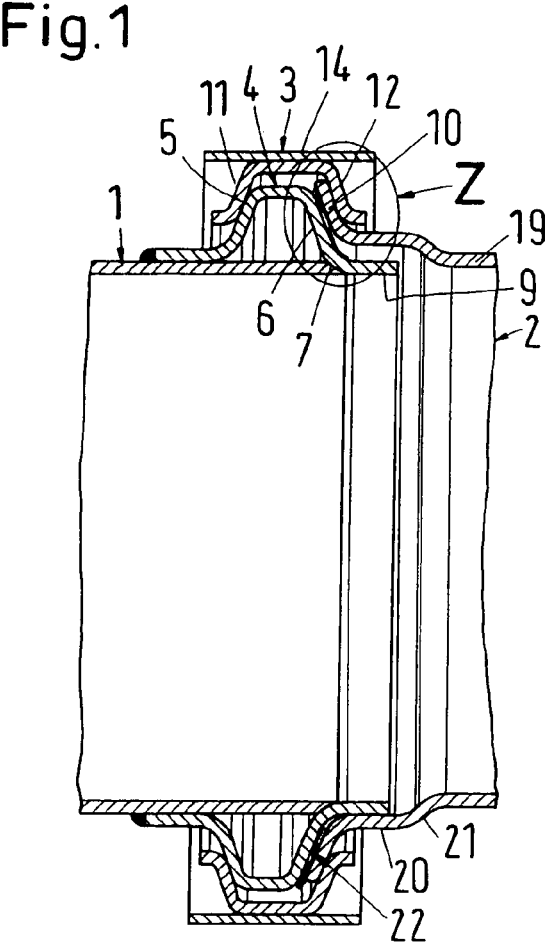
FIG. 1 shows an axial section of a connection of two pipes in accordance with the present invention.
Figure 2:
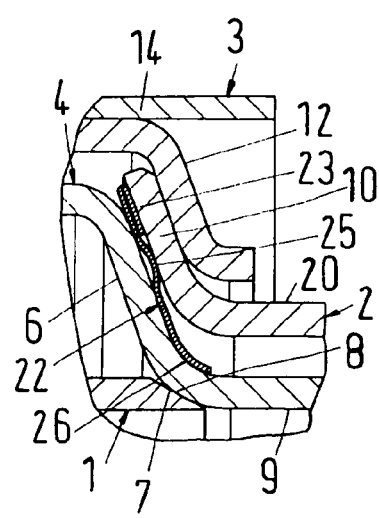
FIG. 2 is a detail view of the pipe connection illustrated in FIG. 1.
Figure 3:
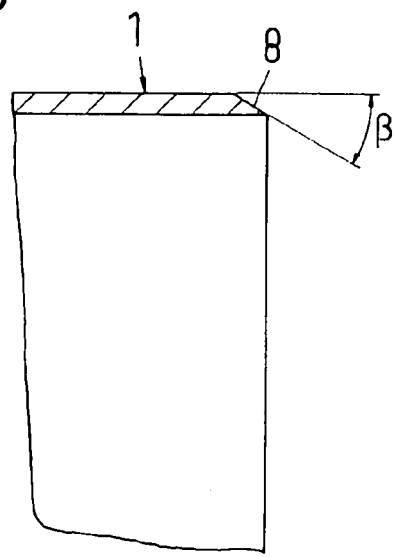
FIG. 3 is another detail view of FIG. 1.

The connection in FIGS. 1 and 2 of a first pipe 1 to a second pipe 2 by means of a tightenable clamp 3 comprises a first flange 4 of springy sheet metal having a slanted first wall 5 and a slanted second wall 6. The wall 5 is welded to the periphery of the first pipe 1. The wall 6 is supported by a rounded portion 7 glidingly on a bevel 8 provided on the free end of the first pipe 1. The bevel 8 is positioned at an acute angle of approximately 30° relative to the axial direction of the pipe 1. The rounded portion 7 passes into a cylindrical projection 9 whose inner and outer diameters are identical to the inner and outer diameters of the first pipe 1. The flange 4 encloses therefore together with the first pipe 1 an annular chamber that is filled with air.

An end section of the second pipe 2 forms a second flange 10.

Figure 4:
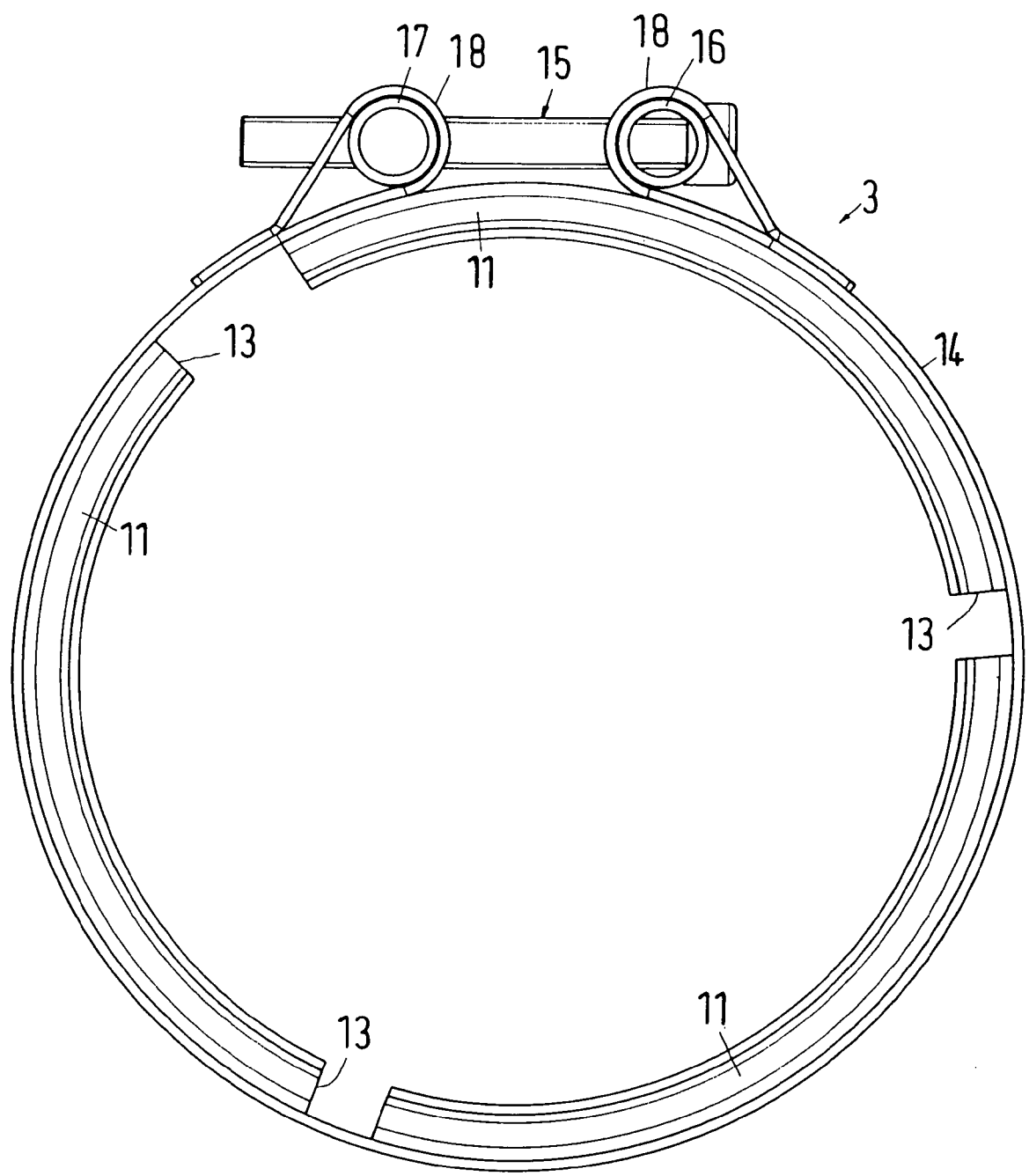
FIG. 4 is an enlarged side view of a clamp that is used for the connection according to FIG. 1.

The clamp 3 engages across the flanges 4 and 10 and pulls together the two flanges 4 and 10 when tightening the clamp 3 by means of conical sidewalls 11 and 12 that are provided in the circumferential direction at identical angular spacings with interruptions 13 (FIG. 4) in order to flexibly secure an outer clamping strap 14 and thus the entire clamp. The clamp 3 is tightened by means of a screw 15. The screw 15 is passed through coaxial holes in a hinged sleeve 16 and through coaxial threaded holes in a hinged sleeve 17. The hinged sleeves 16, 17 are surrounded by loops 18 that are formed by bent-back end sections of the tightening strap 14. The bent-back ends of the loops 18 are welded onto the remaining part of the tightening strap 14. The clamping screw 15 passes through slots in the loops 18.

The second pipe 2 has an elastically bendable cylindrical section 20 between the second flange 10 and the remaining pipe section 19 of the second pipe 2. The inner diameter of the cylindrical section 20 is greater than the outer diameter of the first pipe 1 and of the cylindrical projection 9. The transition section 21 (FIG. 1) between the cylindrical section 20 and the remaining pipe section 19 of the second pipe 2 is conical and also elastically bendable.

A sealing ring 22 of springy sheet steel is clamped in the tightened state of the clamp 3 between the two flanges 4 and 10.

As illustrated in FIGS. 2 and 5 through 7 in more detail, eight edge sections 23 in the form of tabs are bent back onto a portion of the remaining sealing ring section 24. The remaining sealing ring section 24 has a corrugation 25 that projects past the thickness of the bent-over edge sections 23 in the untightened state of the clamp 3; the corrugation 25 extends across the entire circumference of the sealing ring 22. The radial inner edge of the sealing ring 22 is provided at identical circumferential spacings to one another with three compensation tabs 26 that are curved in accordance with the rounded portion 7.

In the following the function and advantages of the illustrated embodiment will be explained in more detail.

Because of the air that is enclosed in the annular chamber between the first flange 4 and the first pipe 1, the flange 4 remains relatively cool when a hot fluid, for example, hot exhaust gas, is passed through the pipes 1 and 2. The first flange 4 accordingly widens thermally in the radial direction to a lesser degree than if it were in direct contact with the hot fluid. However, under the thermal radial expansion pressure of the first pipe 1, it can radially bend inwardly by being supported on the clamp 3 because the wall 6 that is not welded to the first pipe 1 can glide along the free end of the first pipe 1 so that the radial expansion pressure of the first pipe 1 can be received for the most part by the bending action of the flange 4 without being completely transmitted onto the clamp 3. The bevel 8 of the first pipe 1 contributes in particular to this action because the wall 6 of the flange 4 can glide along the bevel 8 when exposed to the radial thermal expansion pressure and the counteracting pressure provided by the clamp 3. Additionally, the rounded portion 7 of the wall 6 of the flange 4 facilitates the gliding action of the wall 6 on the bevel 8.

The elastic cylindrical section 20 has the advantage that it is bent under the thermal expansion pressure in the second pipe 2 and thus also takes up a portion of the expansion pressure. At the same time, the elasticity of the cylindrical section 20 enables an angled arrangement of a radial displacement of the two pipes 1, 2 relative to one another when they are not precisely coaxially aligned with one another as a result of minimal assembly errors.

Since the inner diameter of the cylindrical section 20 is greater than the outer diameter of the first pipe 1, the transition section 21 of the second pipe 2 between the cylindrical section 20 and the pipe section 19 of the second pipe 2 connected thereto can bend under the axial thermal expansion pressure of both pipes 1, 2 and therefore can ensure axial expansion compensation.

The cylindrical projection 9 of the rounded portion 7 of the second wall 6 of the flange 4 has the advantage that a gap or play results between the cylindrical projection 9 of the wall 6 of the first flange 4 and the cylindrical section 20 wherein the projection 9 at the same time forms a cylindrical projection of the first pipe 1 and facilitates the insertion of both pipes into one another because the second pipe 2 is guided on the projection 9. At the same time, both pipes 1, 2 can be centered substantially when they are not coaxially inserted into one another initially.

The conical configuration and elasticity of the transition section 21 facilitated also a radial thermal expansion of the remaining section 19 of the second pipe 2 relative to its cylindrical section 20 and the second flange 10 so that the radial thermal expansion pressure of the second pipe 2 onto the clamp 3 is compensated partially also by the transition section 21.

The sealing ring 22 comprised of sheet steel withstands, on the one hand, high temperatures as they are encountered especially in exhaust gas pipes, but is still elastic in the area of its corrugation 25, on the other hand. This corrugation 25 not only takes up the tightening pressure of the clamp 3 but also partially the axial thermal expansion of both pipes 1, 2 relative to one another without being completely deformed into a plane shape. This back deformation is prevented in that the bent-back edge sections 23 or tabs serve as a stop for the second flange 10 of the second pipe 2. The elasticity of the corrugation 25 remains thus substantially intact. Instead of providing edge sections 23 distributed about the circumference of the sealing ring 22, it is also possible to provide a continuous circumferential edge section about the entire circumference of the sealing ring 22 by crimping. Individual edge sections 23 in the form of tabs however can be bend more easily than a continuous circumferentially extending edge section of the sealing ring 22 that is crimped about the circumference of the remaining sealing ring section 24.

The corrugation 25 extends preferably across the entire circumference of the sealing ring 22. Therefore, it can be formed by a simple stamping tool. Alternatively, it is also possible to divide the corrugation 25 into individual corrugations or to provide radial corrugations that are distributed about the circumference of the sealing ring 22. However, the latter would have as a whole a higher stiffness than the corrugation 25 extending about the entire circumference of the sealing ring section 24.

While specific embodiments of the invention have been shown and described in detail to illustrate the inventive principles, it will be understood that the invention may be embodied otherwise without departing from such principles.

What is claimed is:

1. A connection for connecting pipes to one another; the connection comprising:
    a first pipe having a first flange of sheet metal, wherein the first flange has a first wall connected circumferentially to the first pipe;
    a second pipe having an end section that is shaped as a second flange;
    a tightenable clamp engaging across the first and second flanges and having conical sidewalls forcing the first and second flanges axially against one another when the clamp is tightened;
    wherein the first flange delimits together with the first pipe a closed annular chamber that is coaxial to a longitudinal axis of the first pipe;
        wherein the first flange has a second wall that is glidingly supported on a free end of the first pipe whereby the first flange can move in a radial direction relative to the first pipe so as to compensate for radial expansion pressure of the first pipe, wherein the free end of the first pipe is beveled.

2. The connection according to claim 1, wherein the second wall of the first flange has a rounded portion that is supported on the free end of the first pipe.

3. A connection for connecting pipes to one another; the connection comprising:
    a first pipe having a first flange of sheet metal, wherein the first flange has a first wall connected circumferentially to the first pipe;
    a second pipe having an end section that is shaped as a second flange;
    a tightenable clamp engaging across the first and second flanges and having conical sidewalls forcing the first and second flanges axially against one another when the clamp is tightened;
    wherein the first flange delimits together with the first pipe a closed annular chamber that is coaxial to a longitudinal axis of the first pipe;
        wherein the first flange has a second wall that is glidingly supported on a free end of the first pipe whereby the first flange can move in a radial direction relative to the first pipe so as to compensate for radial expansion pressure of the first pipe, wherein the second pipe has an elastically bendable cylindrical section arranged between the second flange and a remaining section of the second pipe.

4. The connection according to claim 3, wherein the cylindrical section has an inner diameter that is greater than an outer diameter of the first pipe.

5. The connection according to claim 3, wherein the second wall of the first flange has a rounded portion that is supported on the free end of the first pipe and wherein the rounded portion passes into a cylindrical projection, wherein the cylindrical section of the second pipe has an inner diameter that is greater than an outer diameter of the cylindrical projection.

6. The connection according to claim 5, wherein the second pipe has a transition section between the cylindrical section and the remaining section and wherein the transition section is conical.

7. A connection for connecting pipes to one another; the connection comprising:
    a first pipe having a first flange of sheet metal, wherein the first flange has a first wall connected circumferentially to the first pipe;
    a second pipe having an end section that is shaped as a second flange;
    a tightenable clamp engaging across the first and second flanges and having conical sidewalls forcing the first and second flanges axially against one another when the clamp is tightened;
    wherein the first flange delimits together with the first pipe a closed annular chamber that is coaxial to a longitudinal axis of the first pipe;
        wherein the first flange has a second wall that is glidingly supported on a free end of the first pipe whereby the first flange can move in a radial direction relative to the first pipe so as to compensate for radial expansion pressure of the first pipe, further comprising a sealing ring arranged between the first and second flanges, wherein the sealing ring is an elastic sheet steel strap having at least one edge section and a remaining sealing ring section, wherein the at least one edge section is bent back onto a portion of the remaining sealing ring section, wherein the remaining sealing ring section has at least one corrugation that projects past a thickness of the at least one bent edge section in an untightened state of the clamp.

8. The connection according to claim 7, wherein the at least one edge section is a tab.

9. The connection according to claim 7, wherein the at least one corrugation extends about an entire circumference of the sealing ring.

10. A sealing ring for connecting pipes to one another, wherein the connection comprises a first pipe having a first flange of sheet metal, wherein the first flange has a first wall connected circumferentially to the first pipe; a second pipe having an end section that is shaped as a second flange; a tightenable clamp engaging across the first and second flanges and having conical sidewalls forcing the first and second flanges axially against one another when the clamp is tightened; wherein the sealing ring is positioned between the first and second flanges; the sealing ring comprising:
    an elastic sheet steel strap having edge sections and a remaining sealing ring section, wherein the edge sections are formed as tabs bent back onto a portion of the remaining sealing ring section only at defined locations along the circumference of the sealing ring, wherein the remaining sealing ring section has at least one corrugation that projects past a thickness of the at least one bent edge section in an untightened state of the clamp.

11. The sealing ring according to claim 10, wherein the at least one edge section is a tab.

12. The sealing ring according to claim 10, wherein the at least one corrugation extends about an entire circumference of the sealing ring.

* * * * *